(12) United States Patent
Steed et al.

(10) Patent No.: US 7,136,030 B2
(45) Date of Patent: Nov. 14, 2006

(54) INTEGRATED WINDOW DISPLAY

(75) Inventors: Robert L. Steed, Bellevue, WA (US); John R. Cowin, Seattle, WA (US); Timothy M. Mitchell, Seattle, WA (US); Wayne Cavanaugh, Kent, WA (US); Craig A. Larson, Bothell, WA (US); David L. Allen, Kent, WA (US); Tuong Q. Nguyen, Newcastle, WA (US); Ronald C. Doty, Redmond, WA (US); Son T. Nguyen, Renton, WA (US); Kevin L. Gosling, Kirkland, WA (US); Taji Shafaat, Everett, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/383,012

(22) Filed: Mar. 6, 2003

(65) Prior Publication Data

US 2004/0172896 A1    Sep. 9, 2004

(51) Int. Cl.
*B60Q 1/00* (2006.01)

(52) U.S. Cl. .............. 345/7; 345/8; 345/31; 340/815.4; 340/815.49; 340/461

(58) Field of Classification Search ............. 340/995, 340/815.49, 815.4, 815.83, 815.86, 461, 340/980; 455/347–348; 348/837; 345/7, 345/9, 31; 52/204.62; 359/630, 669
See application file for complete search history.

(56) References Cited

U.S. PATENT DOCUMENTS

| | | | | | |
|---|---|---|---|---|---|
| 2,766,540 | A | * | 10/1956 | Brown et al. ................. | 40/574 |
| 4,293,859 | A | * | 10/1981 | Sergent ...................... | 343/702 |
| 4,367,467 | A | * | 1/1983 | Emile, Jr. ..................... | 349/57 |
| 4,391,053 | A | * | 7/1983 | Anthony ...................... | 40/735 |
| 4,446,451 | A | * | 5/1984 | Boulanger .................. | 337/380 |
| 4,625,210 | A | * | 11/1986 | Sagl ........................... | 342/20 |
| 4,749,832 | A | * | 6/1988 | Schlosser .................... | 200/314 |
| 5,013,135 | A | * | 5/1991 | Yamamura .................. | 359/630 |
| 5,028,912 | A | * | 7/1991 | Iino ............................... | 345/7 |
| 5,221,068 | A | * | 6/1993 | Varner et al. .......... | 248/231.41 |
| 5,678,793 | A | * | 10/1997 | Hill ......................... | 248/206.3 |
| 6,049,288 | A | * | 4/2000 | Kawasaki ................ | 340/815.4 |
| 6,805,455 | B1 | * | 10/2004 | Nielsen et al. .............. | 359/877 |

* cited by examiner

*Primary Examiner*—Jeanette Chapman
(74) *Attorney, Agent, or Firm*—Ostrager Chong Flaherty & Broitman P.C.

(57) ABSTRACT

A display system (12) for attachment to a sill (14) of a window structure (26) has been provided. The display system (12) includes a mounting device (28) for attaching the display system (12) to the sill (14) of the window structure (26) and a display device (18) for attachment to the mounting device (26). The display device (18) is intended to communicate various information to the viewer of the display device and preserve or create more available space surrounding the window structure (26).

15 Claims, 7 Drawing Sheets

INTEGRATED WINDOW DISPLAY

TECHNICAL FIELD

The present invention relates generally to a display system, and more particularly to a display system that is integrated within a sill of a window structure, such as a window structure of an aircraft.

BACKGROUND OF THE INVENTION

Display systems are widely utilized for communicating various kinds of information in a variety of environments, e.g. a vehicle and a building. These display systems typically are positioned within locations that allow for efficient use of the surrounding area.

For example, an aircraft can have a variety of gauges integrated within an instrument panel of the cockpit for the purpose of positioning those gauges beyond a space typically utilized for another function. Specifically, the integration of the gauges within the instrument panel can allow a pilot to freely operate the steering tiller of the aircraft without interference from the gauges. Moreover, in this position, the gauges typically do not obstruct the pilot's field of view, hinder the crew members' access to their oxygen masks, or delay the crew members in exiting the aircraft.

Unfortunately, the typical locations in which the display systems are mounted can lack sufficient space or be inadequately shaped for receiving an additional display system. As a result, the display system may be omitted from the environment thereby eliminating the information that could be otherwise provided by the display system.

Therefore, a need exists for a display system that is integrated within a windowsill of a vehicle or a building so as to provide various kinds of information and allow for efficient use of the area surrounding the window structure.

SUMMARY OF THE INVENTION

The present invention provides a display system for attachment to a sill of a window structure. The display system includes a mounting device for attaching the display system to the sill of the window structure and a display device for attachment to the mounting device. The display device is intended to communicate various information to the viewer of the display device.

One advantage of the invention is that a display system for attachment to a sill of a window structure is provided that preserves or increases the availability of space in the areas surrounding the window structure.

Other advantages of the present invention will become apparent when viewed in light of the detailed description of the preferred embodiment when taken in conjunction with the attached drawings and appended claims.

BRIEF DESCRIPTION OF THE DRAWINGS

For a more complete understanding of this invention, reference should now be made to the embodiments illustrated in greater detail in the accompanying drawings and described below by way of examples of the invention.

DETAILED DESCRIPTION OF THE INVENTION

In the following figures the same reference numerals will be used to illustrate the same components in the various views. The present invention is particularly suited for a display system integrated within a windowsill of an aircraft for the purpose of providing various types of information to the crew members of the aircraft while preserving or creating more available space surrounding the windowsill. However, it is understood that the invention can also be suited for a display system integrated within a windowsill of various other vehicles, e.g. an automobile, or even within a windowsill of a building as desired. For example, the display system can be integrated within a windowsill of a residential home. In particular, this integrated display system can be integrated within a kitchen windowsill so as to preserve or create more available space within the kitchen, e.g. the countertop surface area.

Figure 1:
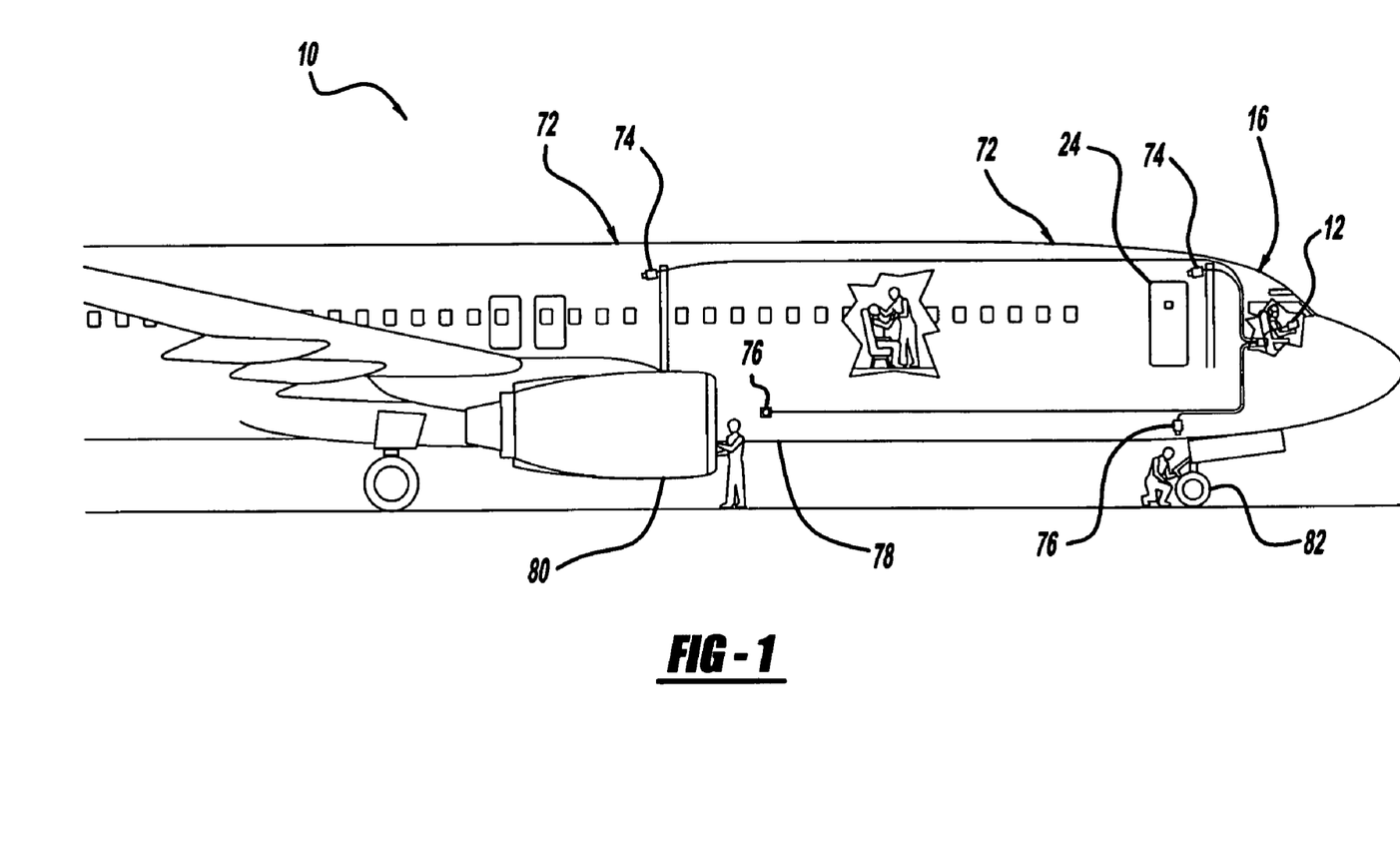
FIG. 1 is a schematic diagram of an aircraft having a display system, according to one embodiment of the present invention.

Referring to FIG. 1, there is shown an aircraft 10 having a display system 12 integrated within a windowsill 14 of the cockpit 16 of the aircraft 10, according to one embodiment of the present invention. This display system 12 is intended to provide various information to crew members located within the cockpit 16 and to preserve or create more available space surrounding the display system 12.

Figure 2A:
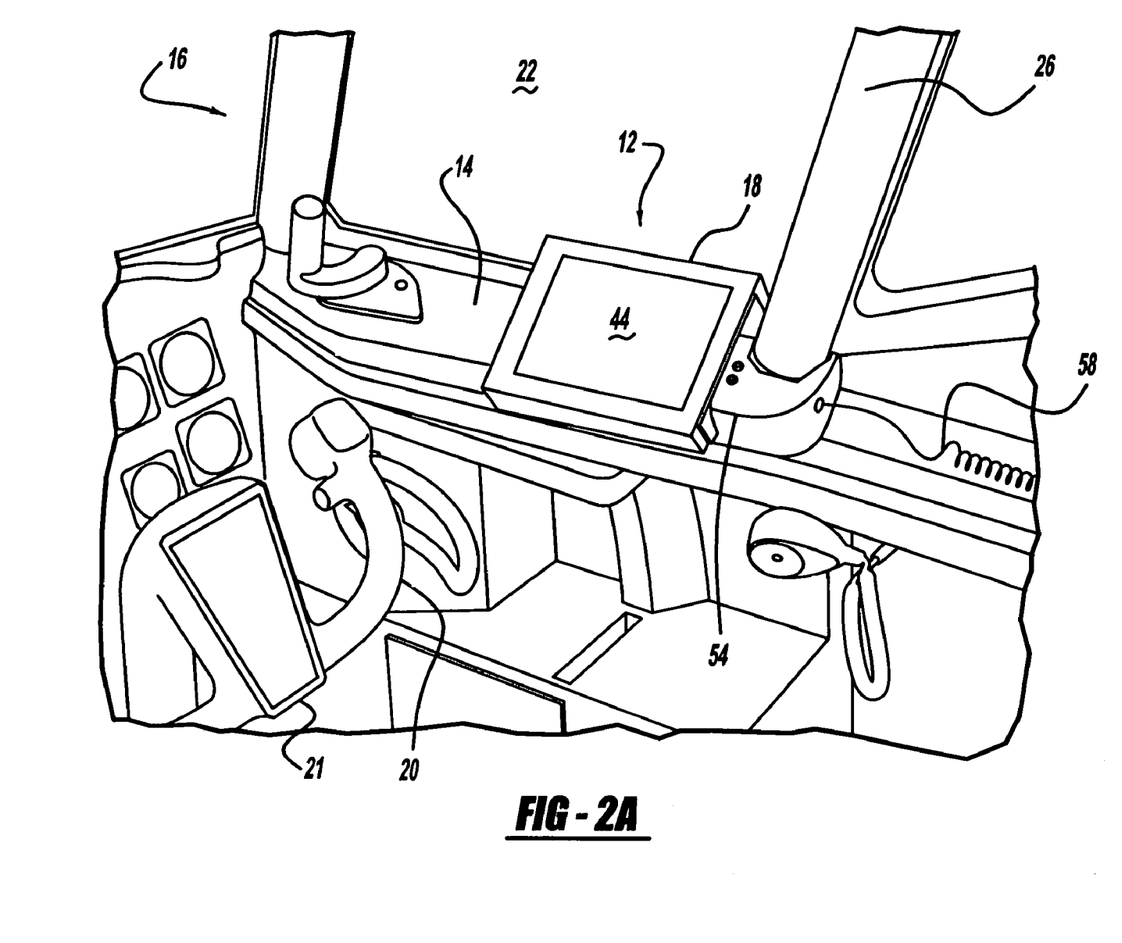
FIG. 2A is a perspective view of a cockpit of an aircraft with a display system integrated within a windowsill of the cockpit according to one embodiment of the present invention.

Referring now to FIG. 2A, there is shown a perspective view of the cockpit 16 of the aircraft 10 with the display system 12 integrated within the windowsill 14 of the cockpit 16 according to one embodiment of the present invention. The attachment of the display system 12 to the windowsill 14 does not obstruct movement of the crew member within the cockpit 16 nor does it interfere with the operation of the aircraft 10.

Figure 3A:
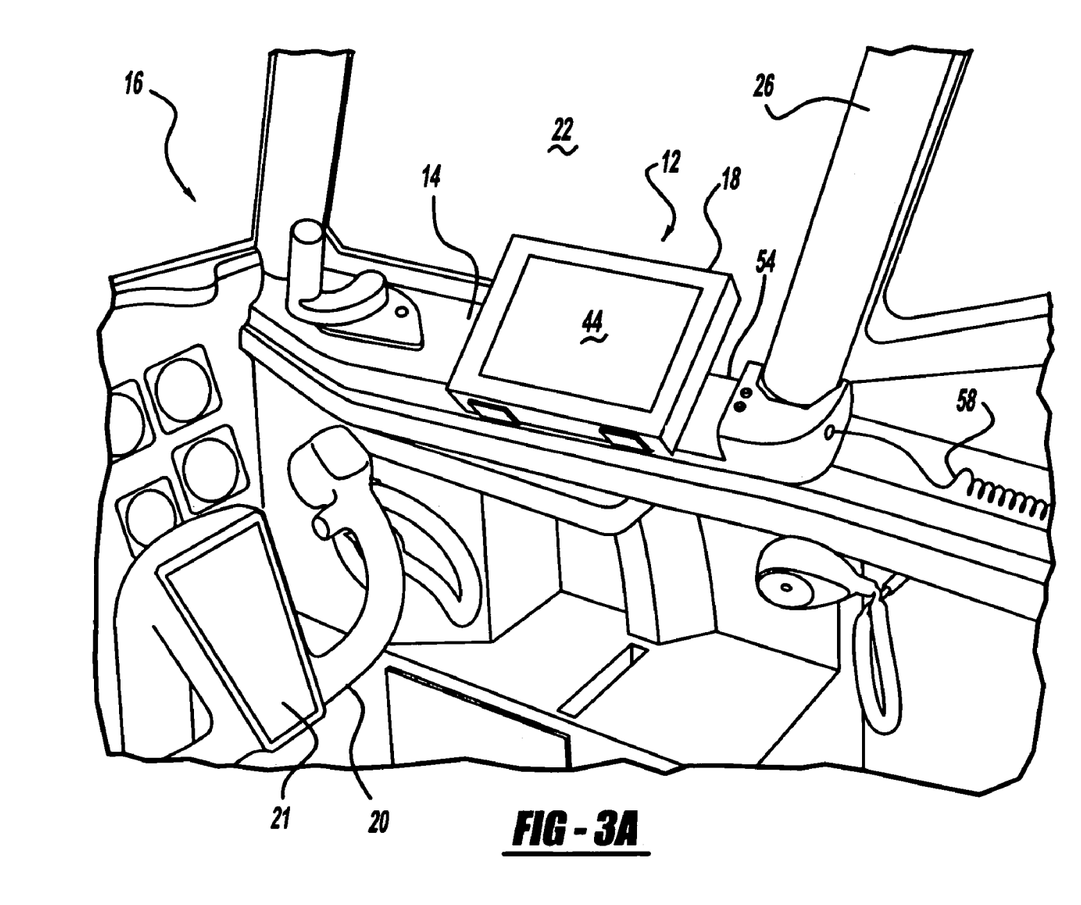
FIG. 3A is a perspective view of a cockpit of an aircraft with a display system integrated within a windowsill of the cockpit according to another embodiment of the present invention.

For instance, as best shown in FIGS. 2A and 3A, the display system 12 is positioned on the windowsill 14 beyond the swept envelope of a nose wheel steering tiller 20 and the swept envelope of the yoke 21. As is known in the art, the windowsill 14 of an aircraft 10 typically is positioned at a predetermined distance from the steering tiller 20 and the yoke 21 so as to permit the tiller 20 and the yoke 21 to have all ranges of free movement without interference from the windowsill 14. The display system 12 may extend from the windowsill 14 toward the tiller 20 and the yoke 21 at a maximum extension distance, e.g. about one inch, without encroaching the swept envelope of the tiller 20 and the yoke 21. In this regard, the display system 12 allows a pilot to access and operate the steering tiller 20 without interference from the display system 12.

In addition, the display system 12 is located on the windowsill 14 beyond the emergency egress path of a flight crew member. For example, the display system 12 may be inset within the windowsill 14 in a suitable position for allowing unfettered egress of the crew member through a moveable windowpane 22 of the aircraft 10. Also, the display system 12 can be positioned on the windowsill 14 in an acceptable location for providing an unimpeded walking path from the cockpit 16 to the nearest exit 24.

In accordance with yet another example, the display system 12 is attached to the windowsill 14 beyond the swept path utilized by a flight crew member for strapping on his oxygen mask. In other words, the display system 12 is not positioned between the crew member and the location where oxygen mask is stored. This configuration allows the crew member to freely obtain the mask, strap the mask onto his head, and then receive a flow of oxygen within a relatively short period of time, e.g. five seconds.

Still, according to another example, the display system 12 is integrated within the windowsill 14 beyond a pilot's field of view so as to prevent the display system 12 from distracting the pilot as he operates the aircraft 10. This feature allows the pilot to focus his concentration on safely performing his responsibilities.

Each of these examples illustrates that the integration of the display system 18 within the windowsill 14 of the cockpit 16 provides a crew member with sufficient room for operating the aircraft 10 in a safe and efficient manner. However, it is understood that the integration of the display system 12 within the windowsill 14 can provide for a variety of other advantages, as well.

Figure 2B:
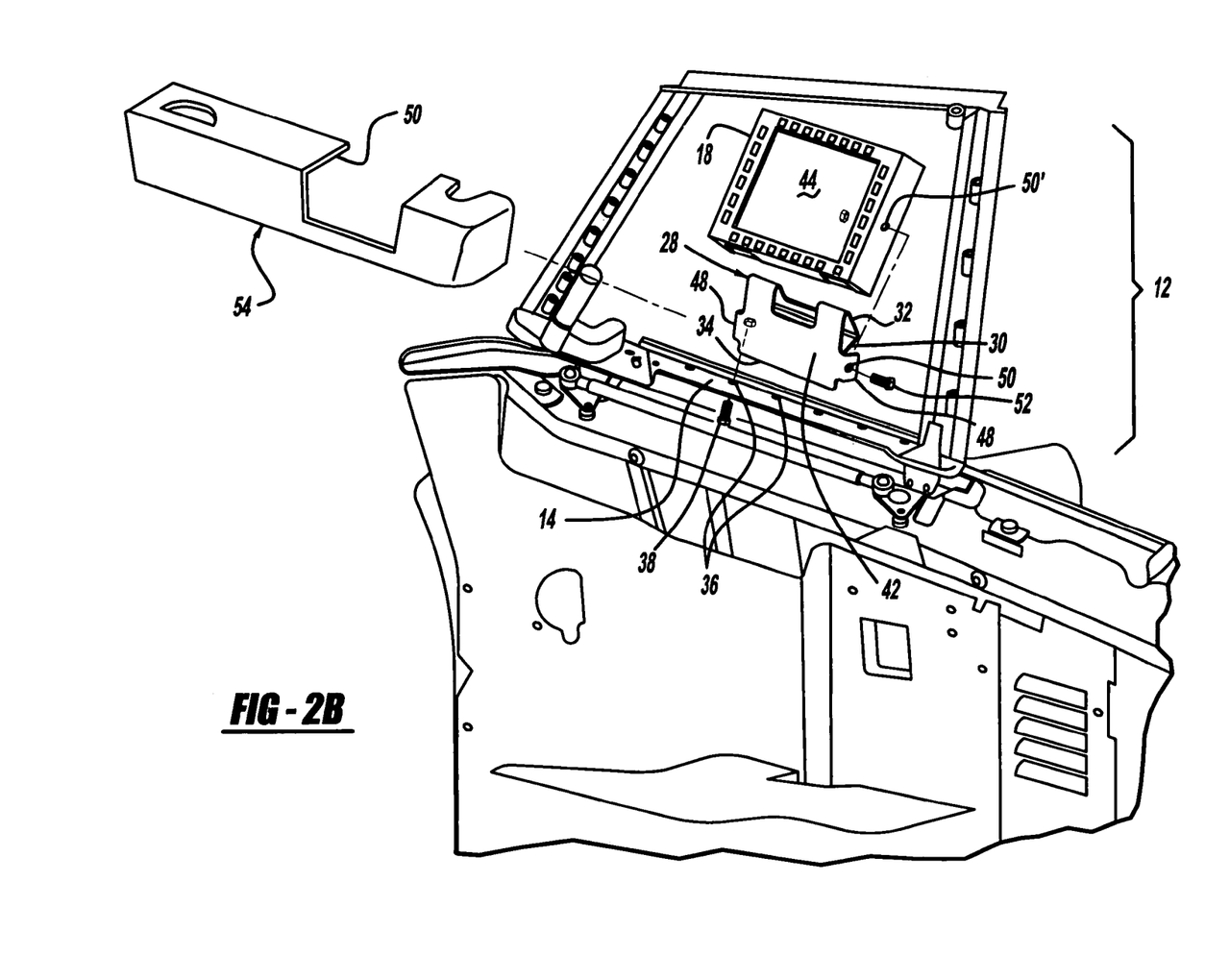
FIG. 2B is an interior rear exploded view of the display system shown in FIG. 2A.

Referring now to FIG. 2B, there is shown a cutaway exploded view of the display system 12 shown in FIG. 2A, illustrating the attachment of the display device 18 to the windowsill 14. Specifically, the display system 12 includes a window structure 26 that is an integral part of the aircraft 10. This window structure 26 has the windowsill 14 integrated therein. The windowsill 14 is intended to have a mounting device 28 attached thereon.

The mounting device 28 is a one-piece bracket with a sill attachment portion 30, an extension portion 32 extending from the sill attachment portion 30, and a display attachment portion 34 extending from the extension portion 30. The sill attachment portion 30 is fixedly attached to the windowsill 14. In this respect, the sill attachment portion 30 has one or more holes 36 for receiving a nut and bolt fastening pair 38. Likewise, the windowsill 14 has one or more holes 36' for receiving the nut and bolt fastening pair 38. This nut and bolt fastening pair 38 is utilized to attach the sill attachment portion 30 of the mounting device 28 to the windowsill 14. However, it is understood that a variety of other suitable fasteners or attachment methods may be utilized. Moreover, it is also understood that the mounting device 28 can be an integral part of the window structure 26 as desired.

The extension portion 32, the display attachment portion 34, or both the extension portion 32 and the display attachment portion 34 have an opening 40 integrally formed therethrough for allowing an individual to access the nut and bolt fastening pairs 38 and attach the mounting device 28 to the windowsill 14. This opening 40 preferably is rectangular in shape and positioned above the sill attachment portion 30. However, it is understood that the opening 40 can be otherwise sized or shaped as desired or otherwise positioned on the display attachment portion 34 in other suitable locations. Moreover, the display attachment portion 34 may not even include this opening 40 as desired.

The display attachment portion 34 includes a shelf portion 42 for supporting a bottom side of the display device 18. This shelf portion 42 preferably is located at a predetermined position relative to the sill attachment portion 30 so as to position a display screen 44 of the display device 18 generally perpendicular to the average-sized crew member's line of sight. This configuration can provide various-sized crew members with an acceptable view of the screen.

Figure 2C:
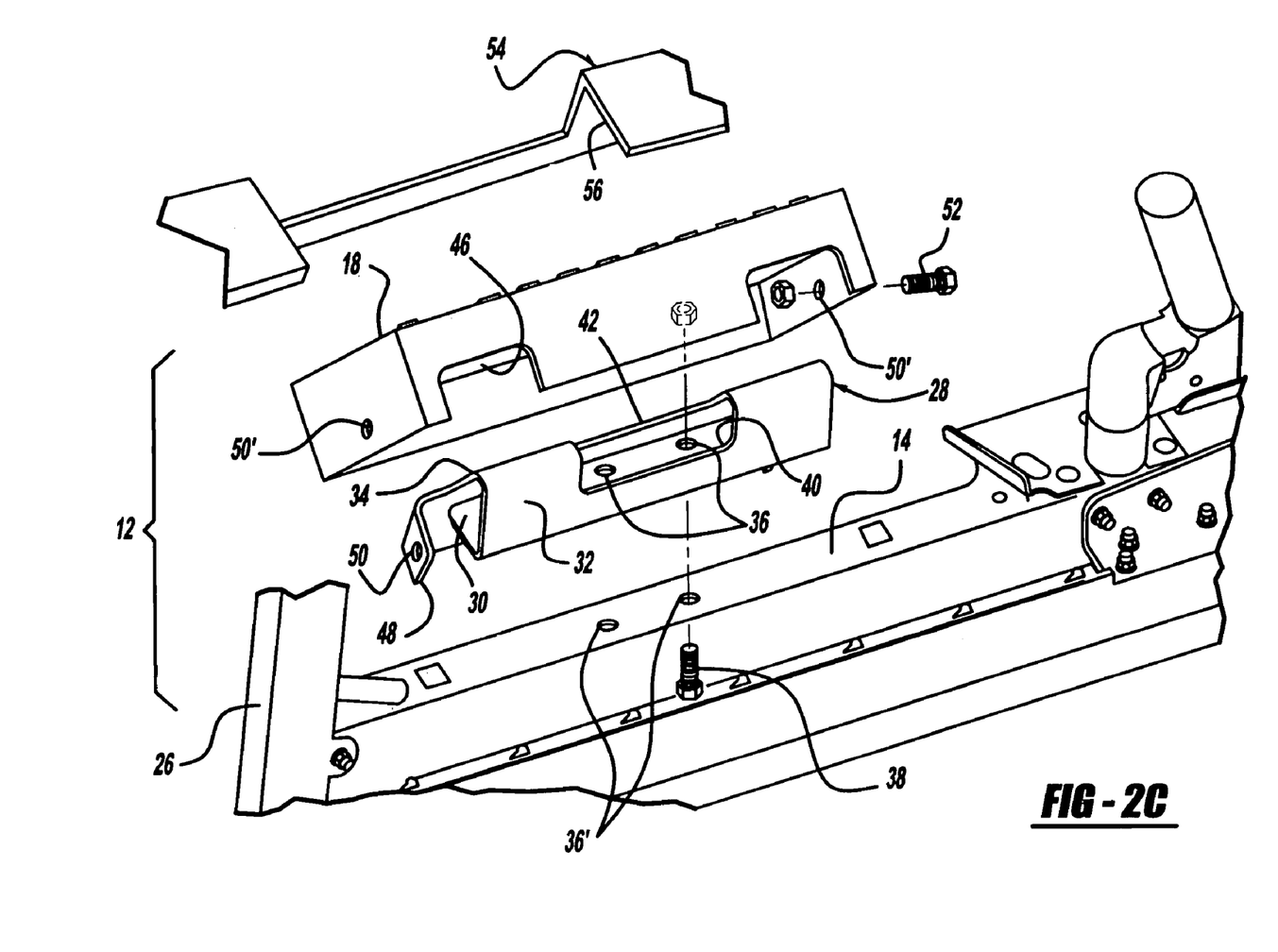
FIG. 2C is an exterior rear exploded view of the display system shown in FIG. 2A.

Also, the shelf portion 42 is sufficiently sized for allowing the display attachment portion 34 to be inserted within a recess 46 formed within the bottom side of the display device 18 (as shown in FIG. 2C). This engagement allows the display device 18 to be mounted closer to the window structure 26 and farther from the swept paths and the swept envelopes utilized for safe operation of the aircraft 10.

In addition, the shelf portion 42 includes a pair of tabs 48 extending generally perpendicularly from opposing sides of the shelf portion 42. Each tab 48 has one or more apertures 50 formed therethrough for receiving a nut and bolt fastening pair 52. Similarly, the display device 18 defines one or more apertures 50' for receiving the fastening pair 52. This fastening pair 52 is intended to attach the display device 18 to the display attachment portion 34. Alternatively, various other suitable fasteners, fastening methods, and constructions can be employed for attaching the display device 18 to the display attachment portion 34 of the mounting device 28.

Furthermore, the display system 12 includes a sill panel 54 for attachment to the window structure 26 and concealment of a substantial portion of the mounting device 28 and the display device 18. Specifically, the panel 54 defines a display device hole 56 through which a crew member can access the display device 18. Preferably, the top surface of the display device 18 is level with the top surface of the panel 54. Additionally, the panel 54 preferably is smooth and contoured. As best shown in FIG. 2A, this construction is beneficial because it can prevent a crew member from having his clothes or body parts inadvertently caught on a sharp corner or edge of the display device 18 or the panel 54 itself. However, it is understood that the display device 18 may instead be positioned above or below the top surface of the panel 54 as desired. The panel 54 is attached to the window structure 26 by nut and bolt fastening pairs and alternatively other suitable fasteners or fastening methods.

In further reference to FIG. 2A, the display system 12 also includes a bundled cord 58 through which power and data are delivered to the display device 18. This cord 58 can also be utilized to provide power to a thermal resistor integrated within the windowpane 22.

Figure 3B:
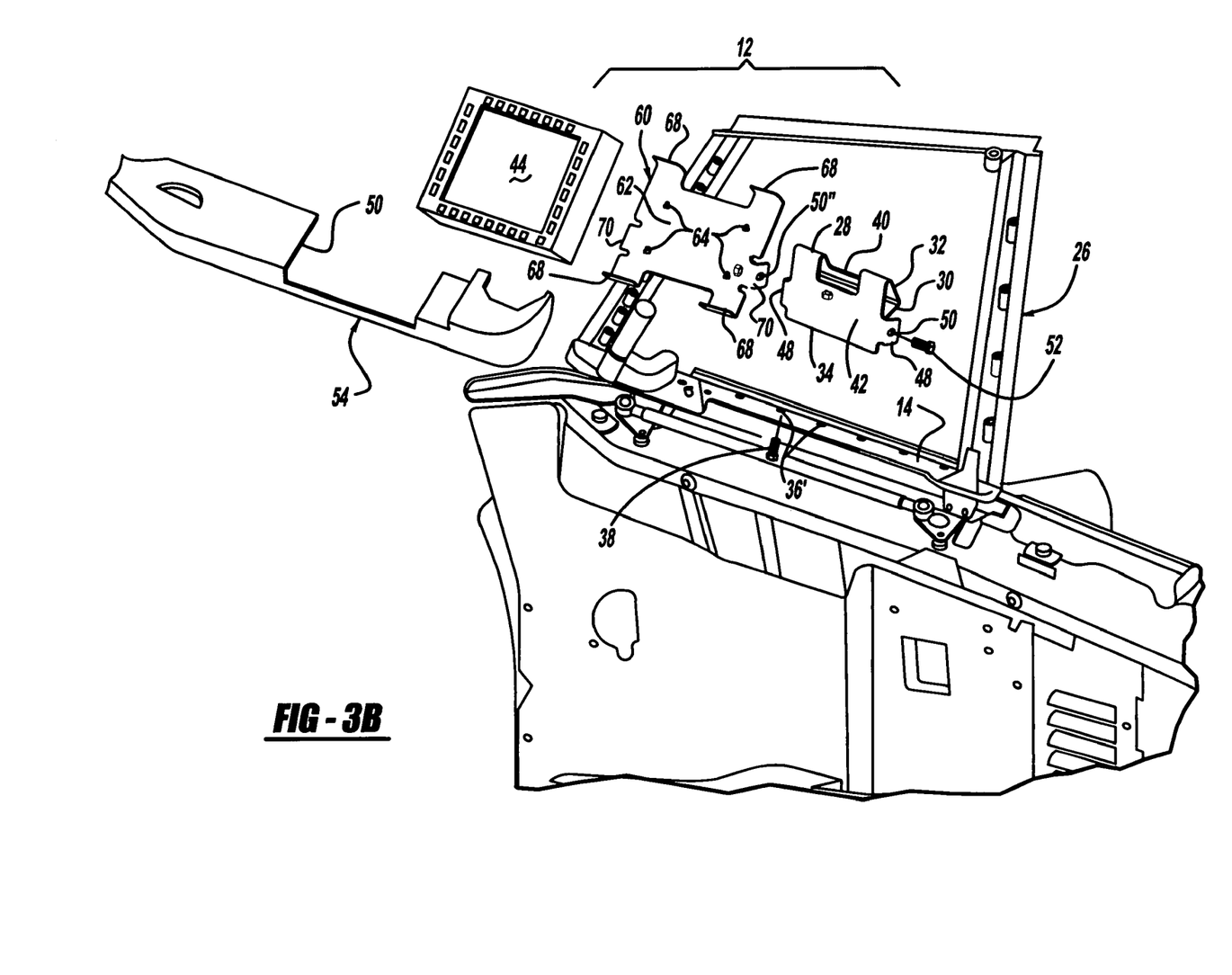
FIG. 3B is an interior rear exploded view of the display system shown in FIG. 3A.
Figure 3C:
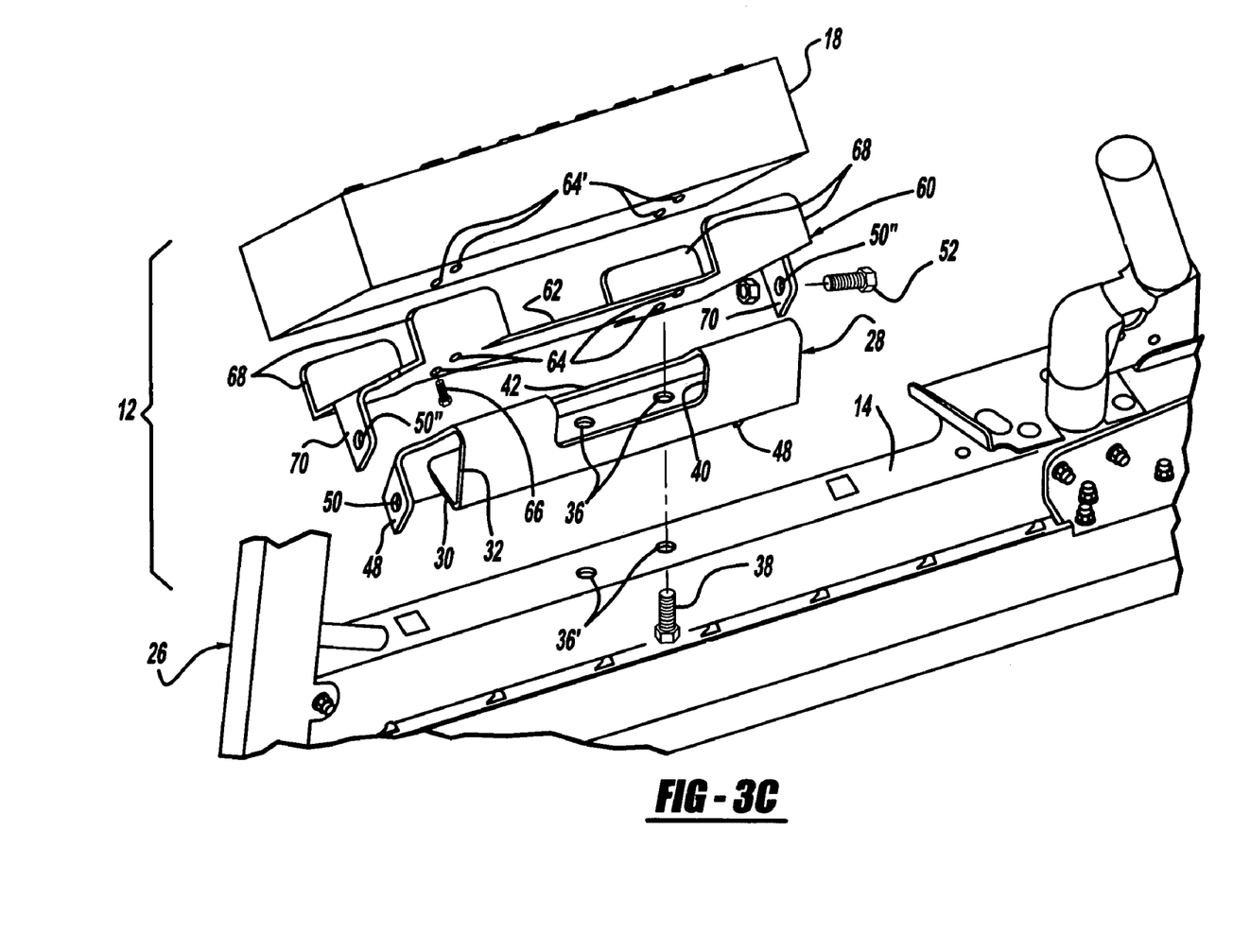
FIG. 3C is an exterior rear exploded view of the display system shown in FIG. 3A.

Referring now to FIGS. 3A–3C, there is shown a display system 12 according to another embodiment of the present invention. In this embodiment, the display device 18 further comprises a mounting tray 60 for attaching the display device 18 to the mounting device 28. This tray 60 is beneficial because it allows for the attachment of a display device 18', which lacks a recess formed within its bottom side.

This mounting tray 60 preferably includes a platform portion 62 with four notches 64 formed therein for permitting four fasteners 66 to pass therethrough. These fasteners 66 are intended to be inserted into respective notches (as shown in FIG. 3C) formed within the display device 18. As a result, the mounting tray 60 can be fixedly attached to the display device 18. However, it is understood that the tray 60 can include more or less than four notches 64 as desired. It is also understood that various other suitable fasteners or fastening methods can be utilized as desired. Moreover, the platform portion 62 includes four perimeter ledges 68 extending therefrom for positioning the display device 18 on the platform portion 62. However, it is understood that more or less than four ledges 68 can be employed in other embodiments of the invention.

Furthermore, the mounting tray 60 includes a pair of flaps 70 extending therefrom for engaging the pair of tabs 48 extending from the mounting device 28. Each flap 70 has one or more apertures 50″ formed therein for allowing the fastener 64 to pass therethrough and into the respective aperture 50 formed within the respective tab 48. As a result, the mounting tray 60 and the display device 18 are attached to the windowsill 14.

As exemplified in FIG. 3C, it is understood that the sill panel 54 may still be utilized to conceal the window structure 26 yet lack the construction for covering a substantial portion of the display system 12. As a result, the structures of the display device 18 and the mounting device 28 can be exposed to the cockpit 16 and thus be more accessible to the crew members within the cockpit 16.

The mounting device 28 and the mounting tray 60 preferably are comprised of a metal material. However, it is understood that these components 28, 60 can instead be comprised of a ceramic material, a laminate material, or a plastic material as desired.

Referring back to FIG. 1, as introduced above, the display system 12 can be utilized for providing various kinds of information to a flight crew member located within the cockpit 16 of the aircraft 10.

For example, the display system 12 can provide surveillance of a passenger cabin 72 to a crew member located within the cockpit 16. In this regard, the display system 12 can be used in conjunction with one or more interior cameras 74 positioned in predetermined areas of one or more of the passenger cabins 16 of the aircraft 10. These interior cameras 74 are electronically coupled to a display device 18 located within the cockpit 16. These cameras 74 are intended to receive images of the events occurring within the passenger cabins 72, convert those images into a video stream, and then transmit the video stream to the display device 18 within the cockpit 16. This surveillance is beneficial because it can provide early detection of a dangerous situation, e.g. a hijacking attempt, which can arise in the passenger cabin 72. Specifically, the display system 12 can alert the flight crew members of the dangerous situation and provide them with sufficient time to adequately prepare themselves for managing the problem.

By way of another example, the display system 12 can be utilized for providing surveillance of an exterior region of the aircraft 10 which can otherwise be difficult or impossible to view from the cockpit 16. In particular, the display system 12 can be used in conjunction with one or more exterior cameras 76 integrated within one or more predetermined sections of the outer skin 78 of the aircraft 10. These exterior cameras 76 are electronically coupled to the display device 18 and are intended to receive images illustrating the location of nearby ground crew members, convert those images into a video stream, and then transmit the video stream to the display device 18 that is located within the cockpit 16. This surveillance is beneficial because it can notify the pilot that a ground crew member is located in a potentially dangerous area thereby allowing the pilot to take appropriate action for averting the danger. For instance, the display system 12 may communicate to the pilot that a ground crew member is positioned adjacent to an engine 80 of the aircraft 10. As a result, this information may allow the pilot to abort from increasing power to that engine 80 thereby preventing possible injury to the ground crew member. In addition, the exterior cameras 76 may be utilized for communicating to the pilot that a ground crew member is located in the path of a landing gear 82 of the aircraft 10. This information can allow the pilot to abort from taxiing the aircraft 10 on the tarmac toward the ground crew member, which would otherwise result in harm to the ground crew member. However, it is understood that the exterior cameras 76 can be utilized for providing the pilot with a variety of other suitable information.

According to yet another example, the display device 18 is an I/O interface that can be electronically coupled to a computer having a database of various information. This information can comprise a database of the crew members and their respective skills and backgrounds. This information can be beneficial for enabling the pilot to delegate a particular responsibility to a crew member who is most qualified for that responsibility. Alternatively, the information can comprise a database of airport maps, which can assist a pilot in determining an appropriate direction of approach for landing the aircraft 10 and taxiing the aircraft 10 on the tarmac. However, it is understood that the information can be comprised of a variety of other suitable kinds of information as desired While particular embodiments of the invention have been shown and described, numerous variations and alternate embodiments will occur to those skilled in the art. Accordingly, it is intended that the invention be limited only in terms of the appended claims.

What is claimed is:

1. An aircraft display system comprising:
an aircraft having a window structure with a windowsill;
a mounting device extending from said windowsill; and
a display device coupled to said mounting device;
wherein said mounting device is a on-piece bracket comprising a sill attachment portion coupled to said windowsill, a display attachment portion having at least one tab extending therefrom for coupling to said display device, wherein each of said at least one tab defines a plurality of apertures for receiving at least one fastener and coupling said display device to said tab, and an extension portion extending between said sill attachment portion and said display attachment portion;
wherein at least one of said display attachment portion and said extension portion includes an opening formed therethrough for allowing access to said sill attachment portion.

2. The aircraft display system of claim 1 wherein said sill attachment portion defines at least one hole for receiving at least one sill fastener for coupling said sill attachment portion to said windowsill.

3. The aircraft display system of claim 1 wherein said mounting device is comprised of material selected from the group consisting of a metal material, a ceramic material, a plastic material, and a composite laminate material.

4. The aircraft display system of claim 1 wherein said display system is positioned beyond a field of forward view for a pilot.

5. An aircraft display system comprising:
an aircraft having a window structure with a windowsill;
a mounting device extending from said windowsill; and
a display device coupled to said mounting device;
wherein said mounting device is a one-piece bracket comprising a sill attachment portion coupled to said windowsill, a display attachment portion having at least one tab extending therefrom for coupling to said display device, wherein each of said at least one tab defines a plurality of apertures for receiving at least one fastener and coupling said display device to said tab, and an extension portion extending between said sill attachment portion and said display attachment portion;

wherein at least one of said display attachment portion and said extension portion includes an opening formed therethrough for allowing access to said sill attachment portion;

wherein said display device is disposed beyond a swept envelope of a nose-wheel steering tiller and positioned for being in a constantly open lone of sight for a pilot seated adjacent thereto.

6. The aircraft display system of claim 5 wherein said sill attachment portion defines at least one hole for receiving at least one sill fastener and coupling said sill attachment portion to said sill.

7. The aircraft display system of claim 5 wherein said display attachment portion has at least one tab extending therefrom for coupling to said display device.

8. The aircraft display system of claim 7 wherein each of said at least one tab defines an aperture for receiving at least one display fastener and coupling said display device to said tab.

9. The aircraft display system of claim 5 wherein said mounting device is comprised of material selected from the group consisting of a metal material, a ceramic material, a plastic material, and a composite laminate material.

10. An aircraft display system comprising:
an aircraft having a window structure with a windowsill;
a mounting device extending from said windowsill; and
a display device coupled to said mounting device;
wherein said mounting device is a on-piece bracket comprising a sill attachment portion coupled to said windowsill, a display attachment portion having at least one tab extending therefrom for coupling to said display device, wherein each of said at lest one tab defines a plurality of apertures for receiving at least one fastener and coupling said display device to said tab, and an extension portion extending between said sill attachment portion and said display attachment portion;

wherein at least one of said display attachment portion and said extension portion includes an opening formed therethrough for allowing access to said sill attachment portion;

wherein said display device is disposed beyond a swept envelope of a nose-wheel steering tiller and positioned for being in a constantly open lone of sight for a pilot seated adjacent thereto;

wherein said display device is disposed beyond a swept envelope of a yoke;

wherein said display device is positioned beyond an emergency egress path through said window structure.

11. The aircraft display system of claim 10 wherein said sill attachment portion defines at least one aperture for receiving at least one sill fastener for coupling said sill attachment portion to said sill.

12. The aircraft display system of claim 10 wherein said display attachment portion has at least one tab extending therefrom for coupling to said display device.

13. The aircraft display system of claim 12 wherein each of said at least one tab defines a hole for receiving at least one display fastener and coupling said display device to said tab.

14. The aircraft display system of claim 10 wherein said mounting device is comprised of material selected from the group consisting of a metal material, a ceramic material, a plastic material, and a composite laminate material.

15. The aircraft display system of claim 10 wherein said display device is positioned beyond an oxygen mask access path utilized for accessing an oxygen mask.

* * * * *